Sept. 4, 1928.
O. C. RITZ WOLLER
WARNING LIGHT
Filed July 13, 1925
1,682,948
2 Sheets-Sheet 1
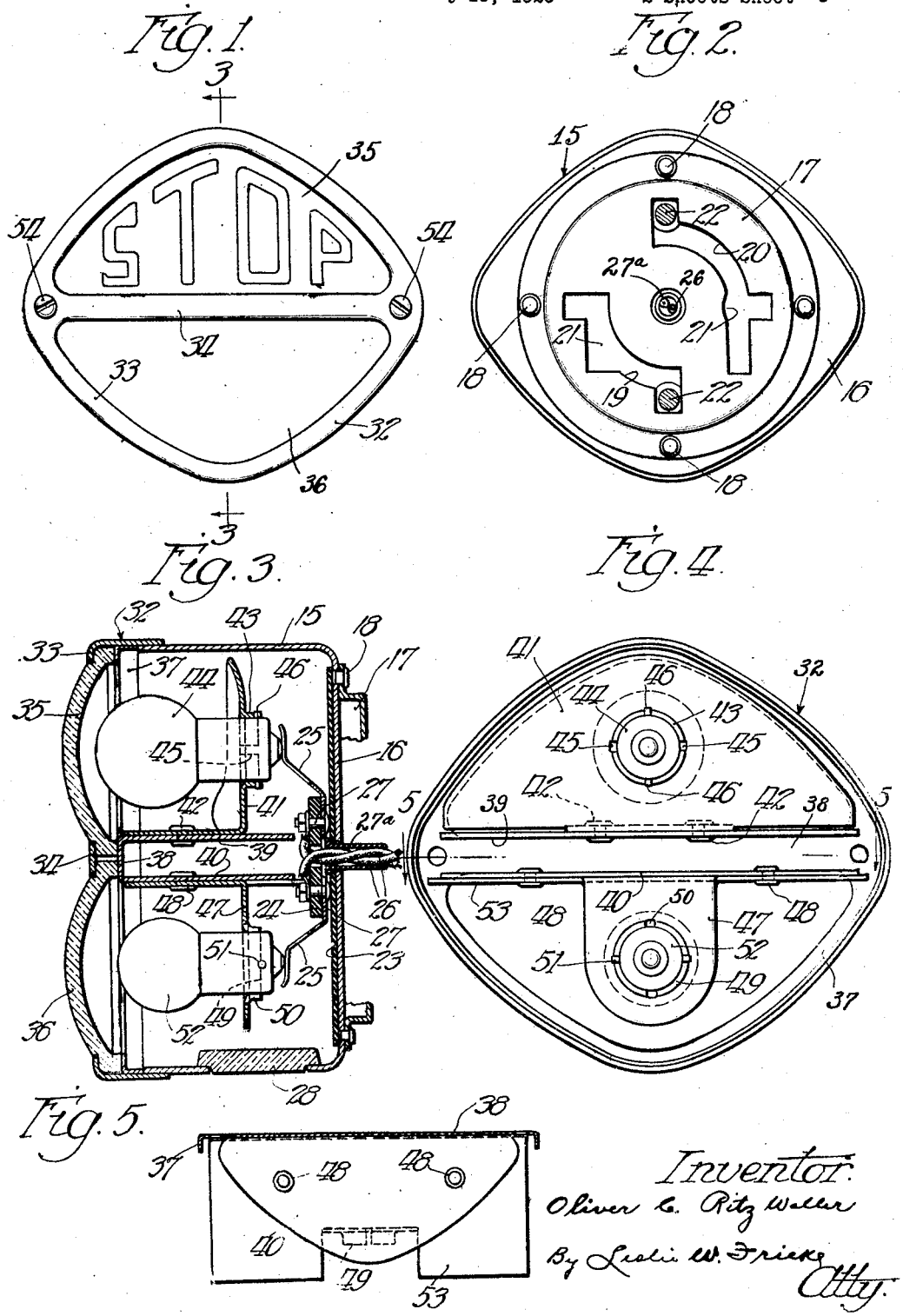

Sept. 4, 1928.  
O. C. RITZ WOLLER  
1,682,948  
WARNING LIGHT  
Filed July 13, 1925 2 Sheets-Sheet 2
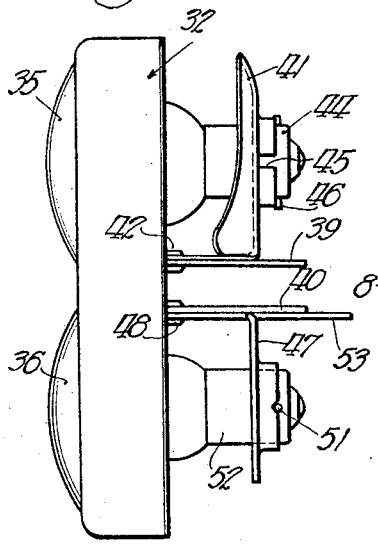
Fig. 6.
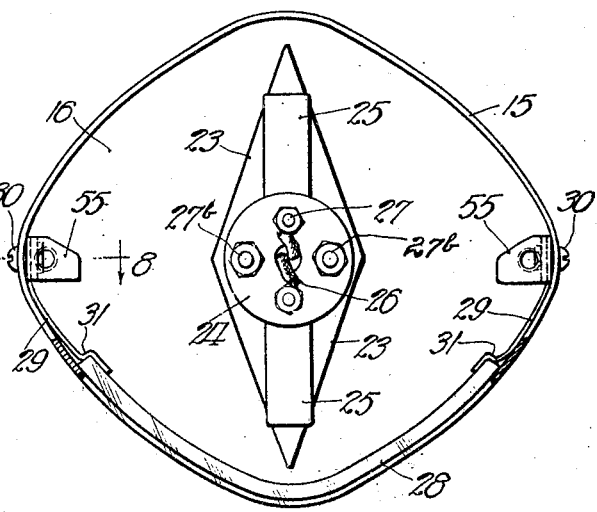
Fig. 7.
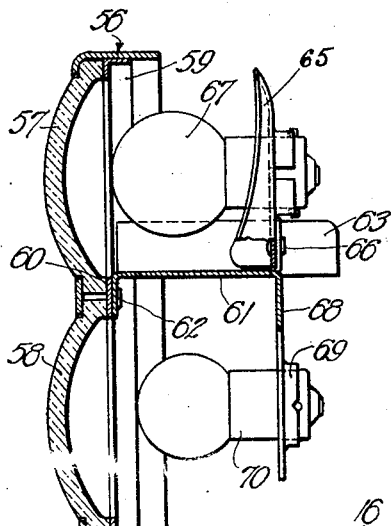
Fig. 10.
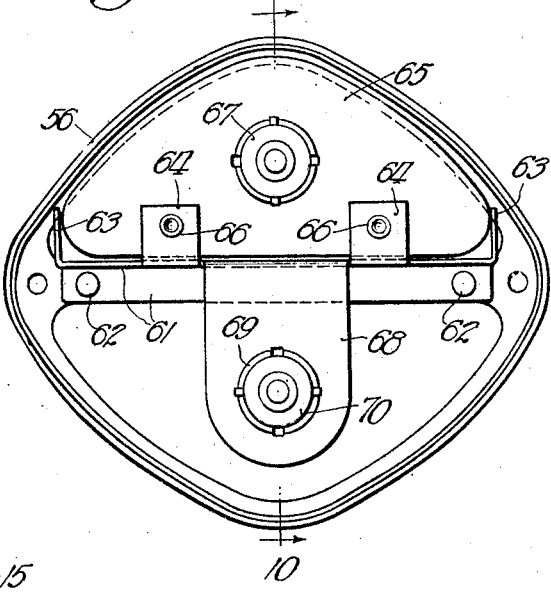
Fig. 9.
Fig. 8.
Inventor  
Oliver C. Ritz Woller  
By Leslie W. Fricke  
Atty.

Patented Sept. 4, 1928.

1,682,948

UNITED STATES PATENT OFFICE.

OLIVER C. RITZ WOLLER, OF CHICAGO, ILLINOIS.

WARNING LIGHT.

Application filed July 13, 1925. Serial No. 43,105.

My invention relates to combined stop and tail lights of the type adapted for use with automobiles, and it has for its principal objects—

To provide an improved arrangement of parts comprising a plurality of units adapted to be easily and quickly connected together and as readily disconnected for affording access to the interior of the device for adjustment or for replacement of bulbs or other parts;

To provide a construction of this type in which the colored glasses are capable of quick replacement in one of the units by which they are held firmly while the unit is being secured in operative position;

To provide improved means for securing the glasses in the unit so as to enable them to be quickly inserted and quickly removed, and otherwise to improve such unit with respect to low cost of manufacture and ease of production and assembly;

To provide an improved arrangement of parts for holding the bulbs or globes removably in position, one of which parts is preferably in the form of a reflector, and To improve devices of this type in sundry details hereinafter pointed out. The preferred means by which I have accomplished my several objects are illustrated in the drawings and are hereinafter specifically described. That which I believe to be new and desire to secure by this application is set forth in the claims.

In the drawings—

Fig. 1 is a face view of my improved device;

Fig. 2 is a rear view;

Fig. 3 is a vertical cross section taken substantially on the line 3—3 of Fig. 1, a part of the supporting bracket of the device having been broken away;

Fig. 4 is a rear view of the front unit of my device;

Fig. 5 is a horizontal sectional view, taken substantially on the line 5—5 of Fig. 4;

Fig. 6 is a side view of the front unit of my device;

Fig. 7 is a front view of the rear unit, a portion of the casing being broken away at the bottom;

Fig. 8 is an enlarged and detailed view, being a fragmentary cross section taken on line 8—8 of Fig. 7;

Fig. 9 is a view similar to Fig. 4, but showing a modified form of construction; and Fig. 10 is a vertical cross section taken on the line 10—10 of Fig. 9.

Referring to Figs. 1 to 8 inclusive—15 indicates a casing member formed from sheet metal, being closed at its rear end by a cross plate 16 and being open at its front end. This casing member is adapted to be secured upon a suitable part of an automobile by means of a bracket 17 also made of sheet metal and secured in position in spaced relation to the plate 16 by means of rivets 18. As is best shown in Fig. 2, the bracket 17 is provided with two oppositely disposed slots 19 and 20 in diagonal position across the bracket, each of said slots comprising a portion extending vertically and a portion extending horizontally, the vertical portions of the two slots being in alignment with each other and the horizontal portions of the two slots being in alignment with each other. In the construction shown the intermediate portions of the slots are in the form of arcs of a circle arranged concentrically with each other. At the point 21 in each of said slots, the size of the slot is increased so as to permit the insertion of the head of a bolt 22 by which the bracket is to be secured in position.

By the use of the arrangement of slots above described, the bracket 17 is capable of being secured in position with the bolts 22 extending through holes in some part of the frame work of a car, such holes being arranged one above the other, one at one side of the other, or with the holes otherwise arranged in varied relative positions and at varied distances apart.

Upon the inner face of the plate 16 I have provided a piece of fiber 23, and in front of that a smaller piece of fiber 24. Upon the member 24 I have mounted contact members 25 in the form of spring arms, such contacts being secured in position upon the member 24 and being connected with lead-in wires 26 by means of bolts 27. The wires 26 extend through a fiber bushing 27$^a$. The members 23 and 24 are secured to the back plate 16 by bolts 27$^b$. By this construction, the contacts 25 are suitably insulated from the casing member 15.

At the bottom portion of the casing member 15 the metal is cut away to provide a window for a piece of plain glass 28 (see Figs. 3 and 7) which is shaped to conform to the shape of the casing, being of slightly greater length and width than the opening in the casing and having its outer face of reduced size so as to fit snugly in the opening with its outer face substantially flush with the outer face of the casing. As is clearly shown in Fig. 7, this member 28 is held in position by means of spring retainers 29 which are secured in the casing by means of bolts 30. The retainers 29 are provided with shoulders at 31 which abut against the ends of the member 28, the arrangement being such that when the glass 28 is pressed upwardly on its outer face the spring members 29 serve to prevent displacement of the glass. When, however, one of the retainers 31 is moved inwardly by pressure thereon away from the adjacent portion of the casing, the glass 28 may be readily removed.

The remaining portions of my improved device are made in the form of a single compact unit which is detachably connected with the unit above described, the unit already described being the base or fixed unit while the other unit may be considered as the detachable unit.

This detachable unit comprises a sleeve or casing ring 32 which is telescopically connected with the casing member 15 as is clearly shown in Fig. 3. This casing member 32 is made of sheet metal, having a flange 33 at its front edge and being provided with a cross bar 34 extending horizontally at its middle point, the flange and the cross bar being formed integrally with the sleeve in the construction illustrated. Mounted within the sleeve 32 are two lenses or colored glass members 35 and 36, such glasses being held in position within the sleeve 32 by a flanged retaining ring 37 which fits snugly within the sleeve so as to be readily slidable into and out of position therein, the arrangement being such that the friction of the ring 37 against the inner face of the sleeve 32 serves to hold the glasses 35 and 36 removably in position, the ring 37 being provided with a cross bar 38 formed integrally therewith in position to stand opposite the cross bar 34 of the casing member 32. As will be readily understood, the sleeve 32 and ring 37 comprises in effect a bezel by which the colored glasses are securely held in position and from which the glasses can be very readily removed when desired. In the construction shown the glass 35 is of a green color, being formed with letters thereon, such letters in the construction shown comprising the word "Stop". The glass 36 in the construction shown is of a red color.

The cross bar 38 is provided at its top and bottom edges with rearwardly extending arms 39 and 40, such arms in the construction shown being formed of the metal cut out in the formation of the ring 37. Upon the arm 39 I have provided a reflector 41 secured by means of rivets 42 upon the upper face of the arm 39. The reflector 41 is formed of sheet metal comprising a socket 43 adapted to receive an electric light globe 44, the socket 43 being slotted at 45 to permit the passage of pins 46 carried by the globe. The edge of the socket 43 is notched at oppositely disposed points for receiving the pins 46, the globe being held firmly in position with the pins engaging the notches by reason of the spring pressure of the adjacent contact arm 25 upon the rear end of the globe.

The rearwardly extending arm 40 also is provided with a bracket 47 formed of sheet metal and secured by means of rivets 48 upon the bottom face of the arm 40. The bracket 47 in like manner is provided with a socket 49 similar to the socket 43, comprising slots 50 at its top and bottom portions and suitable notches for receiving the pins 51 of the globe 52, this globe being held in position by the spring pressure of the lower spring contact arm 25.

The bracket 47 comprises a horizontally disposed plate 53 extending substantially to the front face of the plate 16 of the fixed casing member (see Fig. 5) such plate 53 serving as a partition between the globes 44 and 52.

The casing members 15 and 32 are adapted to be secured detachably together by means of bolts 54 passing through suitable openings in the bezel member and having screw threaded connection with brackets 55 carried by the casing member 15, in the construction shown such brackets 55 being secured in position by means of the bolts 30 above referred to.

In the use of my improved device, whenever it is desired to obtain access to the interior of the casing, this can be done by the removal of the bolts 54, whereupon the sleeve 32 can be very readily slipped out of position upon the open end of the casing member 15. With the removable unit of the device attached in this manner, the globes 44 and 52 may be readily slipped out of position in the sockets, or the sleeve 32 can be slipped out of position about the ring 37 for the removal of the colored glasses 35 and 36. Upon the reinsertion of the parts, the device is held together in the form of a unit by reason of the snug working fit of the parts, so that the colored glasses and the globes are replaced within the casing 15 in the form of a compact unitary structure so that there is no danger of any one of the parts being dropped and broken.

Referring now to Figs. 9 and 10 which show a modified form of construction, 56 indicates the sleeve member of the casing provided with colored glasses 57 and 58. The cooperating bezel member 59 is similar to the ring 37 except that the cross bar 60 formed with the retaining member 59 is not provided with rearwardly extending arms as in the construction above described. In lieu thereof, a bracket 61 is secured by means of rivets 62 upon the cross bar 60, such bracket being of a size and shape adapted for forming a partition between the upper and lower portions of the casing, such partition in the construction shown being provided with vertically disposed flanges 63 at the side edges. The bracket 61 is provided with upwardly extending lugs 64 to which a reflector 65 such as that before described is connected by means of rivets 66, the reflector 65 being provided with a suitable socket for supporting the globe 67.

At its middle point, the bracket 61 is provided with a downwardly extending arm 68 which is equipped with an integrally formed socket 69 of the same type as that described in connection with the bracket 47, such arm 68 being adapted to removably support a globe 70.

Inasmuch as the modified form of construction operates in the same manner as that above described in connection with the form disclosed in Figs. 1 to 8, it is believed to be unnecessary to describe the same further.

While my invention is shown as applied to a combination tail light and stop light for an automobile, I do not desire to limit myself in this way, since it is evident that it is adaptable for use in any type of warning light device for an automobile or for any other purpose as may be desired. It is also to be understood that I do not wish to be limited to the details of construction as illustrated in my drawings and as above described except so far as the same may be specifically claimed, inasmuch as it is clear that changes may well be made in the details of construction without departing from the spirit of my invention.

I claim:

1. A warning light device, comprising in combination a casing member in the form of a ring and having parts projecting inwardly therefrom, a lens in the opening of the ring with its edge portions engaging the inwardly projecting parts of the ring, a retaining member slidably mounted in said ring and held by friction removably therein for holding the lens in position, a bracket carried by said retaining member and projecting backwardly therefrom for supporting an electric light globe therein opposite said lens, a second casing member, and means for detachably connecting said two casing members together serving thereby to secure said retaining member positively in position in said ring.

2. A warning light device, comprising in combination a casing member in the form of a flanged ring, a bar extending across the ring, lenses in the openings on opposite sides of the bar with their edge portions seated against the bar and the flange, a retaining member slidably mounted in said ring and comprising a bar opposite the bar of the ring, being held by friction removably in the ring for holding the lenses in position, a second casing member, and means for detachably connecting said two casing members together serving thereby to secure said retaining member positively in position in said ring.

3. A warning light device comprising two rings each having a bar extending across diametrically, two lenses secured between said two rings, a bracket extending rearwardly from one of said cross bars and supported thereby, a reflector secured to said bracket for supporting an electric light globe thereon, and a socket formed on an arm bent down from the bracket for supporting a second electric light globe.

4. A warning light device comprising two rings each having a bar extending across diametrically, two lenses secured between said two rings, a bracket secured to one of said cross bars and extending rearwardly therefrom, strengthening flanges on the side edges of said bracket, and means for supporting electric light globes both above and below said bracket.

5. A warning light device comprising two rings each having a bar extending across diametrically, two lenses secured between said two rings, a bracket secured to one of said cross bars and extending rearwardly therefrom, and means for supporting electric light globes both above and below said bracket, the bracket being adapted to serve as a substantially complete partition between the two globes.

6. A warning light device comprising two rings each having a bar extending thereacross, two lenses secured between said two rings, a bracket secured to one of said cross bars and extending rearwardly therefrom, strengthening flanges on the side edges of said bracket, and means for supporting electric light globes both above and below said bracket, said bracket and the flanges carried thereby being adapted to serve as a partition between the two globes.

OLIVER C. RITZ WOLLER.